US007050240B2

(12) United States Patent
Tomioka (10) Patent No.: US 7,050,240 B2
(45) Date of Patent: May 23, 2006

(54) ZOOM OPTICAL SYSTEM

(75) Inventor: Ukyo Tomioka, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 11/222,074

(22) Filed: Sep. 9, 2005

(65) Prior Publication Data

US 2006/0077565 A1   Apr. 13, 2006

(30) Foreign Application Priority Data

Sep. 27, 2004   (JP) ............... 2004-279169

(51) Int. Cl.
*G02B 15/14*   (2006.01)
(52) U.S. Cl. .................... 359/680; 359/691
(58) Field of Classification Search ........ 359/680–683, 359/691–692
See application file for complete search history.

(56) References Cited

U.S. PATENT DOCUMENTS 6,169,635 B1 *   1/2001   Ozaki et al. ............. 359/691
6,522,476 B1 *   2/2003   Koreeda ................. 359/681
6,804,064 B1 *  10/2004   Hirakawa ............... 359/682

2004/0207929 A1  10/2004   Tomioka ................ 359/680

FOREIGN PATENT DOCUMENTS

JP   2002-196235   7/2002

* cited by examiner

*Primary Examiner*—Scott J. Sugarman
*Assistant Examiner*—M. Hasan
(74) *Attorney, Agent, or Firm*—Arnold International; Jon W. Henry; Bruce Y. Arnold (57) ABSTRACT

A comparatively low f-number, compact two-group zoom optical system that corrects aberrations in the visible and the near-infrared regions includes, in order from the object side, a first lens group of negative refractive power and a second lens group of positive refractive power. The first lens group includes three lens components that are lens elements of negative, negative, negative, and positive refractive power, respectively, in order from the object side. The second lens group includes four lens components that are lens elements of positive, positive, negative, and positive refractive power, respectively, in order from the object side. Aspheric surfaces are disclosed. Certain conditions relating to the focal lengths of the two lens groups, indexes of refraction and Abbe numbers of various lens elements, and radii of curvature of an interior lens element of the second lens group are satisfied to control aberrations in both the visible and the near-infrared regions.

20 Claims, 4 Drawing Sheets

Fig. 1

Spherical Aberration
Fig. 2A

Astigmatism
Fig. 2B

Distortion
Fig. 2C

Spherical Aberration
Fig. 3A

Astigmatism
Fig. 3B

Distortion
Fig. 3C

Fig. 4

Spherical Aberration
Fig. 5A

Astigmatism
Fig. 5B

Distortion
Fig. 5C

Spherical Aberration
Fig. 6A

Astigmatism
Fig. 6B

Distortion
Fig. 6C

ZOOM OPTICAL SYSTEM

TECHNICAL FIELD OF THE INVENTION

The present invention relates to a zoom optical system that can be used in various kinds of video cameras and electronic still cameras that include CCDs (Charge Coupled Devices) as image detectors, and relates especially to a zoom optical system that operates with both visible light in the 400–700 nm range and near-infrared light in the 700–1000 nm range, which are preferable ranges for monitoring camera lenses.

BACKGROUND OF THE INVENTION

While the demand for monitoring cameras has been increasing in order to operate unmanned monitoring facilities, there has also been a demand in recent years for zoom lenses that operate both in the visible light region for operating with visible light during the day and in the near-infrared region for operating with near-infrared light at night. An example of such a zoom optical system including a zoom lens is described in Japanese Laid-Open Patent Application 2002-196235.

The zoom lens described in Japanese Laid-Open Patent Application 2002-196235 has a compact two-group construction with, in order from the object side, a first lens group having negative refractive power and a second lens group having positive refractive power. Such a construction with a lens group having negative refractive power on the object side has the advantage of being useful for providing a wide maximum field angle and for easily providing an appropriate rear focus. However, when a two-group lens construction of negative and positive lens groups from the object side is provided, the entire lens system becomes asymmetric, variations in aberrations accompanying zooming increase, and especially correction for chromatic aberration becomes important in order to achieve a lens system that operates both in the visible region and in the near-infrared region while obtaining good optical performance over the entire zoom range.

The zoom lens described in Japanese Laid-Open Patent Application 2002-196235 corrects aberrations well by satisfying specified conditions and by making the seventh and eighth lens elements from the object side, which belong to the image-side lens group, have negative and positive refractive powers, respectively, be made of materials having a large difference in Abbe numbers, and be joined together to form a lens component having negative refractive power.

Especially demanded as a zoom optical system for monitoring cameras is having a relatively large aperture, that is, small f-number, so that a subject can be imaged with adequate brightness for identification even in a low illumination environment. Also, in order to make it possible to monitor over a wide area, increasing the field angle at the wide-angle end is required. Furthermore, being compact and having a good optical performance are also becoming necessary. When an attempt to increase the brightness of the lens system is made, aberration correction becomes more difficult, and thus the difficulty of providing good optical performance over the entire zoom range also increases.

Due to recent progress in the technology of forming aspheric lenses, the conventional design limitation that lenses with aspheric surfaces should be formed with relatively small outer diameters and relatively small center thicknesses has become unnecessary, and even relatively large aspheric lenses can be formed. Given such a technological background, the present range of choices for lenses with aspheric surfaces is expanding.

As described above, monitoring camera lens systems should have chromatic aberrations favorably corrected in both the visible light region and the near-infrared region. Other requirements for monitoring camera lens systems include providing a bright image even in low light illumination by reason of the lens having a low f-number, and being compact. It is desirable to develop a lens system that satisfies these requirements.

BRIEF SUMMARY OF THE INVENTION

The present invention relates to a compact zoom optical system that has good optical performance in both the visible light region and the near-infrared region, and provides comparatively bright imaging with a relatively large aperture, that is, with a small f-number, by using lens elements with aspheric surfaces that are produced according to current technical capabilities of manufacturing such lens elements.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1:
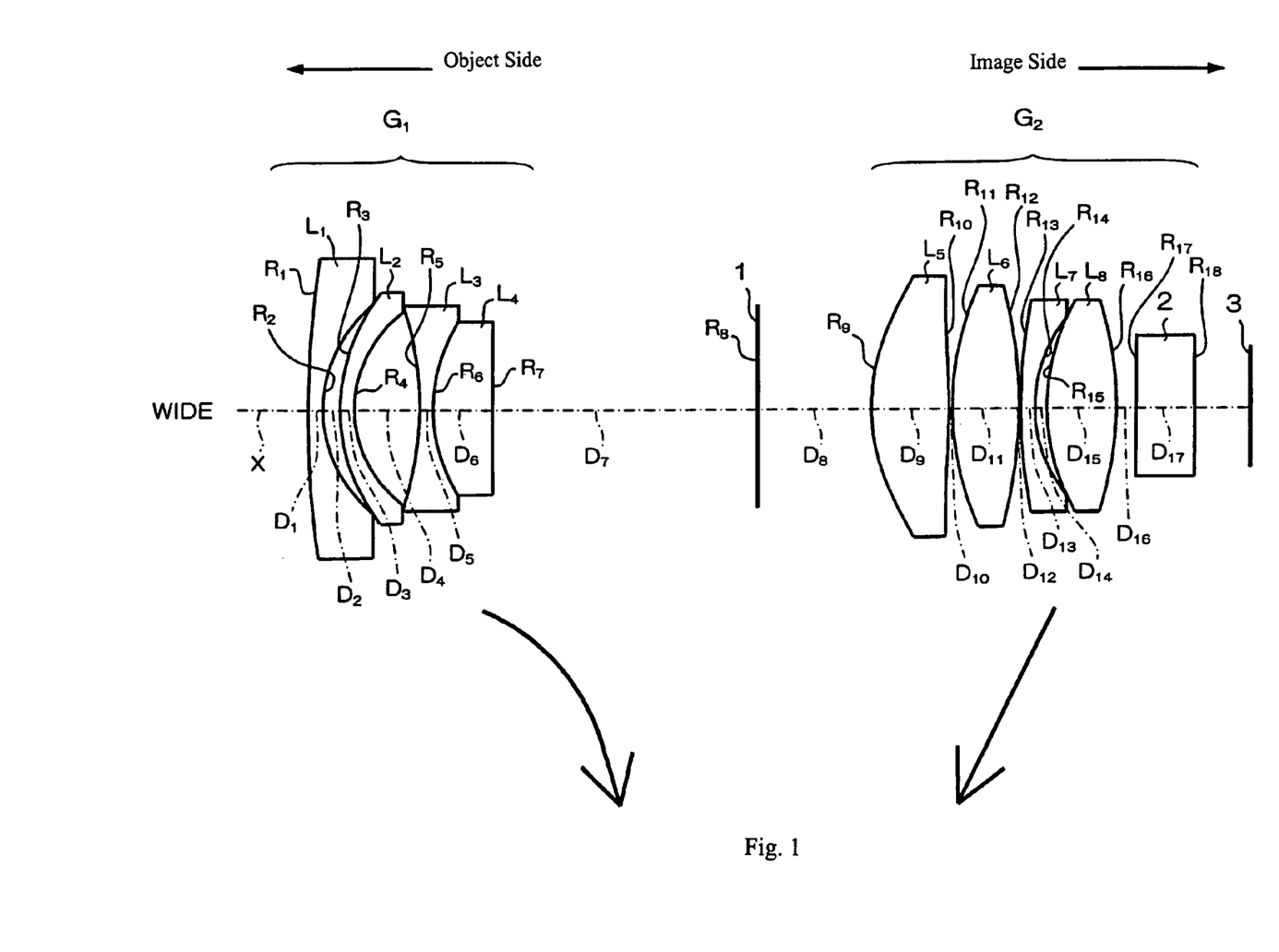
FIG. 1 shows a cross-sectional view of Embodiment 1 of the zoom optical system of the present invention at the wide-angle end.

A general description of a two-group zoom optical system of the present invention will first be described with reference to FIG. 1 that shows Embodiment 1. In FIG. 1, a horizontal arrow at the upper left labeled "Object side" points in the direction indicating the object side of the zoom optical system and a horizontal arrow at the upper right labeled "Image side" points in the opposite direction indicating the image side of the zoom optical system. In FIG. 1, lens elements are referenced by the letter L with a subscript denoting their order from the object side of the zoom optical system along the optical axis X, from $L_1$ to $L_8$. Similarly, radii of curvature of the surfaces of the various optical elements, including the lens surfaces, are referenced by the letter R with a subscript denoting their order from the object side of the zoom optical system, from $R_1$ to $R_{18}$. The on-axis surface spacings along the optical axis X of the various optical surfaces are referenced by the letter D with a subscript denoting their order from the object side of the zoom optical system, from $D_1$ to $D_{17}$. In the same manner, the two lens groups are labeled $G_1$ and $G_2$ in order from the object side of the zoom optical system and the lens elements belonging to each lens group are indicated by the brackets adjacent the labels $G_1$ and $G_2$.

The term "lens group" is defined in terms of "lens elements" and "lens components" as explained herein. The term "lens element" is herein defined as a single transparent mass of refractive material having two opposed refracting surfaces, which surfaces are positioned at least generally transversely of the optical axis of the zoom optical system. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component." The term "lens group" is herein defined as an assembly of one or more lens components in optical series and with no intervening lens components along an optical axis that during zooming is movable as a single unit relative to another lens component or other lens components.

As shown in FIG. 1, a stop 1, such as a diaphragm, that controls the amount of light that passes through the zoom optical system is included between the lens groups $G_1$ and $G_2$. Also as shown in FIG. 1, a cover glass 2 is arranged on the image side of the second lens group $G_2$.

The zoom optical system is designed for use in both the visible light region and the near-infrared region and is particularly suited for mounting in a monitoring camera for use both during the day and at night. As shown in FIG. 1, the two-group zoom optical system of the present invention includes, in order from the object side, a first lens group $G_1$ having negative refractive power and a second lens group $G_2$ having positive refractive power.

An image pickup element (not shown in the drawings), such as a CCD (Charge-Coupled Device) is arranged at an image plane 3 on the image side of the cover glass 2. Various other optical elements may also be arranged between the second lens group $G_2$ and the image plane, such as an infrared cut-off filter.

The zoom optical system includes two lens groups and may include only two lens groups to form a two-group zoom optical system. The zoom optical system zooms from the wide-angle end to the telephoto end by moving the second lens group $G_2$ toward the object side along the optical axis X in order to increase the focal length of the zoom optical system and compensates for movement of the image plane caused by this movement of the second lens group $G_2$ by moving the first lens group $G_1$ toward the image side as the zoom optical system zooms from the wide-angle end to the telephoto end of the zoom range. Downward arrows at the bottom of FIG. 1 show the directions of movement along the optical axis X of the first lens group $G_1$ and the second lens group $G_2$ when zooming from the wide-angle end to the telephoto end. The first lens group $G_1$ also functions as a focusing lens group.

In general terms, the first lens group $G_1$ includes three lens components and four lens elements, in order from the object side, as follows: a first lens element L1-1 (corresponding to lens element $L_1$ of FIG. 1) that is a lens component and has negative refractive power and a meniscus shape; a second lens element L1-2 (corresponding to lens element $L_2$ of FIG. 1) that is a lens component and has negative refractive power and a meniscus shape; and a third lens component that includes, in order from the object side, a third lens element L1-3 (corresponding to lens element $L_3$ of FIG. 1) having a biconcave shape (and therefore having negative refractive power), and a fourth lens element L1-4 (corresponding to lens element $L_4$ of FIG. 1) having positive refractive power.

As shown in FIG. 1, the second lens group $G_2$ includes four lens components, each of which is a lens element, in order from the object side, as follows: an object-side lens element L2-1 (corresponding to lens element $L_5$ of FIG. 1) having positive refractive power and at least one aspheric surface; a biconvex lens element L2-2 (which therefore has positive refractive power and corresponds to lens element $L_6$ of FIG. 1); a lens element L2-3 (corresponding to lens element $L_7$ of FIG. 1) having negative refractive power and a meniscus shape; and a biconvex lens element L2-4 (which therefore has positive refractive power and corresponds to lens element $L_8$ of FIG. 1).

The lens surface or surfaces of the second lens group $G_2$ that are aspheric are defined using the following equation:

$$Z=[(Y^2/R)/\{1+(1-K\cdot Y^2/R^2)^{1/2}\}]+\Sigma(A_i\cdot Y^i) \quad \text{Equation } (A)$$

where

Z is the length (in mm) of a line drawn from a point on the aspheric lens surface at a distance Y from the optical axis to the tangential plane of the aspheric surface vertex, R is the radius of curvature (in mm) of the aspheric lens surface on the optical axis, Y is the distance (in mm) from the optical axis, K is the eccentricity, and $A_i$ is the ith aspheric coefficient, and the summation extends over i.

In embodiments of the invention disclosed below, only aspheric coefficients $A_3$–$A_{10}$ are non-zero.

In the zoom optical system of FIG. 1, all three meniscus lens elements, $L_1$ (L1-1), $L_2$ (L1-2), and $L_7$ (L2-3), have their convex surface on the object side. Additionally, the object-side lens element of the second lens group $G_2$, lens element $L_5$ (L2-1) as shown in FIG. 1, has aspheric surfaces on both sides, along with its biconvex shape, both of which are preferable features. The biconvex shape of the fifth lens element $L_5$ (L2-1) is determined by the fact that a convex shape with greater curvature on the object side is designed for convergence of light and the convex shape of the image-side surface is designed to favorably correct chromatic aberration.

The first lens element $L_1$ (L1-1) is given a form that is appropriate for wide-angle viewing. The image side of the fourth lens element $L_4$ (L1-4) is made planar for ease of manufacture. By making the third lens element $L_3$ (L1-3) and the fourth lens element $L_4$ (L1-4) to be joined as a lens component, chromatic aberration correction can be obtained efficiently, which is especially important in order to use the zoom optical system in both the visible light region and the near-infrared region. Also, by joining these lens elements as a lens component, problems associated with deviations from desired centering of the lens elements on the optical axis, to which optical performance is very sensitive, are reduced, and manufacturing tolerances of the lens elements can be increased, which has substantial manufacturing advantages.

Also, the zoom optical system of the present invention achieves a compact structure and good optical performance in both the visible light region and the near-infrared region while obtaining a wide angle of view and comparatively bright imaging with a relatively large aperture, that is, a small f-number, by satisfying the following Conditions:

$$N_{d21} > 1.55 \qquad \text{Condition (1)}$$

$$v_{d22} > 68 \qquad \text{Condition (2)}$$

$$1.0 < |f2/f1| < 1.8 \qquad \text{Condition (3)}$$

where $N_{d21}$ is the index of refraction at the d-line of the object-side lens element of the second lens group $G_2$, $v_{d22}$ is the Abbe number at the d-line of the biconvex lens element immediately on the image side of the object-side lens element of the second lens group $G_2$, f2 is the focal length of the second lens group $G_2$, and f1 is the focal length of the first lens group $G_1$.

If Condition (1) is not satisfied, the on-axis curvature of the object-side lens element of the second lens group $G_2$, which is lens element L2-1 (lens element $L_5$ in FIG. 1), becomes too large for easy manufacture of the lens element.

Condition (2) allows a conventional lens element of low dispersion material to be used as the biconvex lens element immediately on the image side of the object-side lens element of the second lens group $G_2$ for good performance with visible light and near-infrared light. That is, lens element L2-2 (lens element $L_6$ in FIG. 1) may be a conventional lens element of low dispersion material. If Condition (2) is not satisfied, correcting the on-axis chromatic aberration becomes difficult, making it difficult to maintain good optical performance from the visible light region to the near-infrared light region.

If the lower limit of Condition (3) is not satisfied, the negative refractive power of the first lens group $G_1$ becomes relatively less in absolute magnitude and wide-angle viewing becomes difficult. At the same time, the positive refractive power of the second lens group $G_2$ increases so that the spherical aberration becomes overcorrected and decreasing the f-number becomes difficult. Also, if the upper limit of Condition (3) is not satisfied, the positive refractive power of the second lens group $G_2$ decreases, making miniaturization of the zoom optical system difficult. By regulating the division of optical powers between the first lens group $G_1$ and the second lens group $G_2$, a zoom optical system can be made with a relatively small f-number and a wide-angle of view in balance with achieving miniaturization of the zoom optical system. In contrary terms, in an optical system that does not satisfy this Condition (3), the optical system is designed for other uses than the present invention, or if it is not, the size or focal length of such an optical system would be so different from the present invention that it would not compare favorably with the present invention.

In the zoom optical system of the present invention, because the second lens group $G_2$ includes two lens elements of positive refractive power arranged in the order of the first lens element L2-1 (lens element $L_5$ in FIG. 1) and the second lens element L2-2 (lens element $L_6$ in FIG. 1) from the object side of the second lens group $G_2$, the first lens element L2-1 (lens element $L_5$ in FIG. 1) has a larger diameter than the second lens element L2-2 (lens element $L_6$ in FIG. 1). Because this larger diameter first lens element L2-1 (lens element $L_5$ in FIG. 1) has a large positive refractive power and its object-side surface is made convex with a strong curvature, the whole lens system provides a bright image.

On the other hand, as a zoom optical system used in both the visible light region and the near-infrared region, it is essential to correct on-axis chromatic aberration by the lens elements having positive refractive power and made of a low-dispersion material. However, because low-dispersion materials also have low indexes of refraction, if the object-side lens element L2-1 (lens element $L_5$ in FIG. 1) of the second lens group $G_2$ is formed of such a material, the lens curvature needs to be increased in order to obtain enough refractive power to achieve a small f-number, and manufacturing such a lens element becomes difficult. Therefore, in the zoom optical system of the present invention, the object-side lens element L2-1 (lens element $L_5$ in FIG. 1) of the second lens group $G_2$ is made of a material that satisfies Condition (1) above in order to obtain enough refractive power, and the biconvex lens element L2-2 (lens element $L_6$ in FIG. 1) on its image side is made of a low dispersion material that satisfies Condition (2) above in order to correct on-axis chromatic aberration well so as to maintain good optical performance even if the zoom optical system is used for both the visible light region and the near-infrared region as a zoom optical system having a small f-number.

Including at least one aspheric surface on the object-side lens element L2-1 (lens element $L_5$ in FIG. 1) of the second lens group $G_2$ has the effect of improving spherical aberration correction of the zoom optical system.

Although it has been conventional practice to design lens elements with aspheric surfaces with small thicknesses and small outer diameters based on the restrictions of techniques for forming such lens elements, it is now possible to form an aspheric surface even on a relatively large lens element, and as a result of the widened range of choices of lens designs with aspheric surfaces, it has become possible to make lens elements such as the object-side lens element L2-1 (lens element $L_5$ in FIG. 1) of the second lens group $G_2$ with an aspheric surface or aspheric surfaces.

In the zoom optical system of the present invention, by forming an aspheric surface on the object-side lens element L2-1 (lens element $L_5$ in FIG. 1) of the second lens group $G_2$ as a lens element having positive refractive power, a large diameter, and large refractive power, degradation increasing aberrations in peripheral sections of the lens element can be suppressed. By making this lens element to include at least one aspheric surface, as opposed to the case where the biconvex lens element L2-2 on its image side (lens element $L_6$ in FIG. 1) includes at least one aspheric surface, the optical performance can be well controlled so that, for example, spherical aberration can be well corrected. Accordingly, the zoom optical system of the present invention enables advantages in terms of manufacture because it can maintain good optical performance as a bright lens system and minimize problems associated with deviations from centering of the lens elements on the optical axis.

Furthermore, in the zoom optical system of the present invention, the configuration of the whole optical system is optimized wherein the object-side lens element L2-1 (lens element $L_5$ in FIG. 1) of the second lens group $G_2$ includes at least one aspheric surface. Such optimization also includes, in the example of FIG. 1, the form of the lens element L2-3 (lens element $L_7$ in FIG. 1), that is the lens element immediately on the image side of lens element L2-2 (lens element $L_6$ in FIG. 1) having negative refractive power and a meniscus shape.

In the zoom optical system of the present invention, in order to converge a light beam that is diverged by the first lens group $G_1$ having negative refractive power, the first lens element L2-1 (lens element $L_5$ in FIG. 1) of the second lens group $G_2$ has a surface of large curvature on the object side. Therefore, if this surface were spherical, the positive refractive power would become stronger as it goes away from the optical axis and the spherical aberration would become overcorrected toward the periphery. However, in this zoom optical system, by making this surface of the first lens element L2-1 of the second lens group $G_2$ (lens element $L_5$ in FIG. 1) an aspheric surface of such a form so as to weaken the positive refractive power toward the periphery, the amount of spherical aberration can be reduced. Therefore, the lens element L2-3 (lens element $L_7$ in FIG. 1) that is immediately on the image side of the lens element L2-2 (lens element $L_6$ in FIG. 1) does not have to have strong negative refractive power in the periphery and therefore may have a meniscus shape.

In this way, in the zoom optical system of the present invention, a good optical performance can be maintained even if it is used for both the visible light region and the near-infrared region as a zoom optical system with a small f-number due to the construction of two object side lens elements of positive refractive power that use aspheric surfaces in the second lens group $G_2$, and a compact lens construction is made possible by effective placement of the aspheric lens elements and lens elements made of low dispersion material, including a biconvex lens element of low dispersion material in the second lens group $G_2$. For example, the zoom optical system in FIG. 1 uses eight lens elements and seven lens components with the first lens group $G_1$ including four lens elements and three lens components and the second lens group $G_2$ including four lens elements, each of which is a lens component.

Additionally, even better optical performance can be obtained by the zoom optical system of the present invention (in addition to including the construction of the two object side lens elements of the second lens group $G_2$ discussed above, and satisfying Conditions (1)–(3)) by also satisfying the following Conditions:

$$v_{d14} < 25 \quad \text{Condition (4)}$$

$$v_{d23} < 25 \quad \text{Condition (5)}$$

where $v_{d14}$ is the Abbe number at the d-line of the fourth lens element L1-4 (lens element $L_4$ of FIG. 1) of the first lens group $G_1$, and $v_{d23}$ is the Abbe number at the d-line of the third lens element L2-3 (lens element $L_7$ of FIG. 1) of the second lens group $G_2$.

In correcting chromatic aberration of a zoom optical system, it is desirable that chromatic aberration that occurs within each lens group be corrected by each lens group. By satisfying Conditions (4) and (5) above, the chromatic aberration that occurs within each lens group can be suppressed independently by the first lens group $G_1$ and the second lens group $G_2$, enhancing the correction of chromatic aberration.

In attempting to satisfy Condition (4) above within the first lens group $G_1$, chromatic aberrations are corrected by having the on-axis chromatic aberration and the lateral color that are generated by the lens elements of negative refractive power in the first lens group $G_1$ being compensated for (i.e., canceled out) by the equal in magnitude but opposite in sign on-axis chromatic aberration and lateral color that are generated by the fourth lens element L1-4 (lens element $L_4$ of the first lens group $G_1$ in FIG. 1) which has positive refractive power. If Condition (4) above is not satisfied, it becomes impossible to generate the necessary magnitude of chromatic aberrations at the fourth lens L1-4 (lens element $L_4$ of FIG. 1), with the result that the chromatic aberrations of the first lens group $G_1$ increase.

Similarly, satisfying Condition (5) above enables the correction of chromatic aberrations in the second lens group $G_2$ as a whole by compensating for the on-axis chromatic aberration and the lateral color that are generated by the lens elements in the second lens group $G_2$ that have positive refractive power by using on-axis chromatic aberration and lateral color of equal magnitude but opposite sign generated by the lens element L2-3 (lens element $L_7$ of FIG. 1) of the second lens group $G_2$ that has negative refractive power. If Condition (5) above is not satisfied, it becomes impossible to generate the necessary amount of chromatic aberration in the third lens L2-3 of the second lens group $G_2$, with the result that the chromatic aberrations of the second lens group $G_2$ increase.

Additionally, note that it is desirable to set $v_{d14}$ equal to $v_{d23}$ in order to further correct on-axis aberrations.

Furthermore, advantages in the manufacture of the lens elements that make up the zoom optical system of the present invention can be made by satisfying the following Condition in addition to Conditions (1)–(5) discussed above:

$$|Rf_{22}/Rb_{22}| < 1.0 \quad \text{Condition (6)}$$

where $Rf_{22}$ is the radius of curvature of the object-side surface of the second lens element L2-2 (lens element $L_6$ of FIG. 1) of the second lens group $G_2$, and $Rb_{22}$ is the radius of curvature of the image-side surface of the second lens element L2-2 (lens element $L_6$ of FIG. 1) of the second lens group $G_2$.

If Condition (6) is not satisfied, the curvature of the image-side surface of the second lens element L2-2 (lens element $L_6$ of FIG. 1) of the second lens group $G_2$ becomes greater than that of the object-side surface, and the light ray deflection angle becomes large on-axis, which increases the optical performance sensitivity to centering error of the installed position of this lens element in a direction perpendicular to the optical axis. If this sensitivity to centering error increases, greater precision must be maintained during manufacture, which is undesirable.

Embodiments 1 and 2 of the present invention will now be individually described with further reference to the drawings.

EMBODIMENT 1

FIG. 1 shows a cross-sectional view of Embodiment 1 of the zoom optical system of the present invention at the wide-angle end.

Table 1 below lists the surface number #, in order from the object side, the radius of curvature R (in mm) of each surface on the optical axis, the on-axis surface spacing D (in mm), as well as the refractive index $N_d$ and the Abbe number $v_d$ at the d-line (587.6 nm) of each optical element for Embodiment 1. Note that although R is the on-axis radius of curvature, for convenience of illustration, in FIG. 1 the lead lines from the R reference symbols extend to the surfaces being referenced but do not extend to the on-axis positions.

TABLE 1

| # | R | D | $N_d$ | $\nu_d$ |
|---|---|---|---|---|
| 1 | 53.7091 | 0.78 | 1.83400 | 37.2 |
| 2 | 7.0789 | 0.89 | | |
| 3 | 9.7206 | 0.70 | 1.51633 | 64.1 |
| 4 | 6.2820 | 3.34 | | |
| 5 | −17.0770 | 0.70 | 1.67270 | 32.1 |
| 6 | 8.5937 | 3.04 | 1.92286 | 18.9 |
| 7 | ∞ | D7 (variable) | | |
| 8 | ∞ (stop) | D8 (variable) | | |
| 9* | 10.1803 | 4.00 | 1.58913 | 61.2 |
| 10* | −34.3402 | 0.17 | | |
| 11 | 15.1654 | 3.41 | 1.49700 | 81.6 |
| 12 | −25.1742 | 0.10 | | |
| 13 | 29.0623 | 0.70 | 1.92286 | 18.9 |
| 14 | 7.5144 | 0.63 | | |
| 15 | 11.3523 | 3.51 | 1.72916 | 54.7 |
| 16 | −17.9806 | D16 (variable) | | |
| 17 | ∞ | 3.00 | 1.51633 | 64.1 |
| 18 | ∞ | | | |

The surfaces with a * to the right of the surface number in Table 1 are aspheric lens surfaces, and the aspheric surface shapes are expressed by Equation (A) above. As indicated in Table 1, both surfaces of the lens element $L_5$ of the second lens group $G_2$ are aspheric.

Table 2 below lists the values of the constant K and the aspherical coefficients $A_3$–$A_{10}$ used in Equation (A) above for each of the aspheric lens surfaces of Table 1. Aspheric coefficients that are not present in Table 2 are zero. An "E" in the data indicates that the number following the "E" is the exponent to the base 10. For example, "1.0E-2" represents the number $1.0 \times 10^{-2}$.

TABLE 2

| # | K | $A_3$ | $A_4$ | $A_5$ | $A_6$ |
|---|---|---|---|---|---|
| 9 | −0.1158660 | 7.97E−5 | 1.90E−4 | −7.93E−5 | 9.81E−6 |
| 10 | −44.7790888 | 9.44E−5 | 3.76E−4 | −1.11E−4 | 1.94E−5 |

| # | $A_7$ | $A_8$ | $A_9$ | $A_{10}$ |
|---|---|---|---|---|
| 9 | 7.78E−7 | −1.65E−7 | −1.83E−8 | 2.37E−9 |
| 10 | 1.04E−6 | −5.00E−7 | 9.72E−9 | 2.27E−9 |

In the zoom optical system of Embodiment 1, both the first lens group $G_1$ and the second lens group $G_2$ move during zooming. Therefore, the on-axis spacings D7, D8, and D16 change with zooming. With zooming, the focal length f, the f-number $F_{NO}$, and the field angle, that is, the angle of view, 2 ω of the zoom lens also change. Table 3 below lists the values of the focal length f (in mm), the f-number $F_{NO}$, the field angle 2 ω (in degrees), and the variables D7, D8, and D16 (in mm) at the wide-angle end (f=2.29 mm) and at the telephoto end (f=5.75 mm) when the zoom lens is focused at infinity.

TABLE 3

| f | $F_{NO}$ | 2ω | D7 | D8 | D16 |
|---|---|---|---|---|---|
| 2.29 | 0.99 | 127 | 13.49 | 5.99 | 1.00 |
| 5.75 | 1.47 | 45 | 1.97 | 1.29 | 5.70 |

The zoom optical system of Embodiment 1 of the present invention satisfies Conditions (1)–(6) above as set forth in Table 4 below.

TABLE 4

| Condition No. | Condition | Value |
|---|---|---|
| (1) | $N_{d21} > 1.55$ | 1.58913 |
| (2) | $\nu_{d22} > 68$ | 81.6 |
| (3) | $1.0 < |f2/f1| < 1.8$ | 1.36 |
| (4) | $\nu_{d14} < 25$ | 18.9 |
| (5) | $\nu_{d23} < 25$ | 18.9 |
| (6) | $|Rf_{22}/Rb_{22}| < 1.0$ | 0.602 |

Figure 2A:
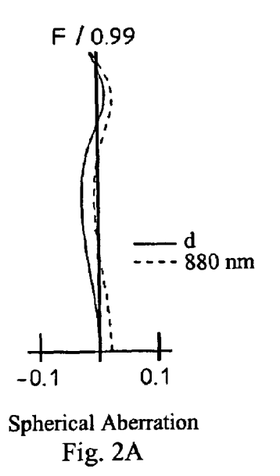
FIGS. 2A–2C show aberrations of Embodiment 1 of the zoom optical system of the present invention at the wide-angle end.
Figure 2B:
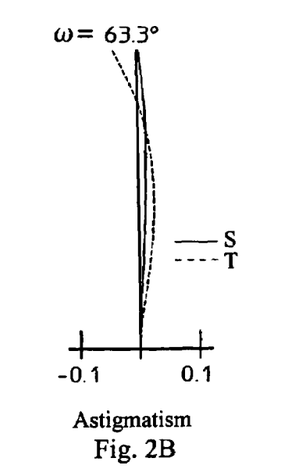
Figure 2C:
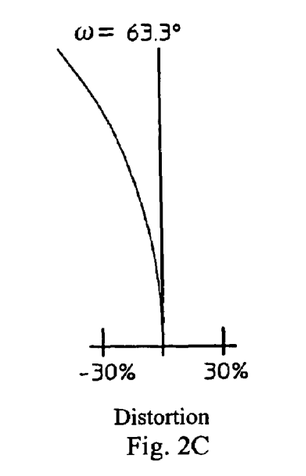
Figure 3A:
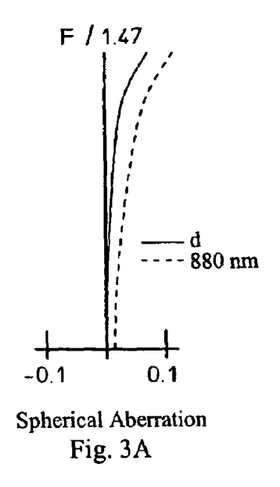
FIGS. 3A–3C show aberrations of Embodiment 1 of the zoom optical system of the present invention at the telephoto end.
Figure 3B:
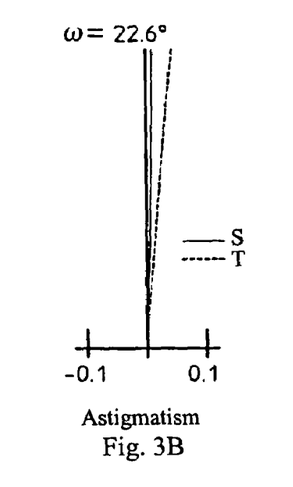
Figure 3C:
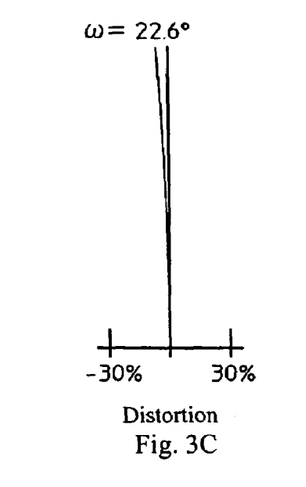

FIGS. 2A–2C show the spherical aberration, astigmatism, and distortion, respectively, of the zoom optical system of Embodiment 1 at the wide-angle end. FIGS. 3A–3C show the spherical aberration, astigmatism, and distortion, respectively, of the zoom optical system of Embodiment 1 at the telephoto end. In FIGS. 2A and 3A, the spherical aberration (in mm) is shown for the wavelengths 587.6 nm (the d-line) and 880 nm and the f-number is shown. In FIGS. 2B, 2C, 3B, and 3C, ω is the half-field angle. In FIGS. 2B and 3B, the astigmatism (in mm) is shown for the sagittal image surface S and the tangential image surface T. In FIGS. 2C and 3C, distortion (in percent) is measured at 587.6 nm (the d-line).

As shown by the above tables and the referenced figures, the zoom optical system of Embodiment 1 has a compact construction of eight lens elements, provides good correction of aberrations in both the visible light region and the near-infrared region, provides a bright image with an f-number in the range of 0.99 to 1.47, and provides a wide field angle, that is, a wide angle of view, 2 ω, from about forty-five degrees to about one hundred twenty-seven degrees.

EMBODIMENT 2

Figure 4:
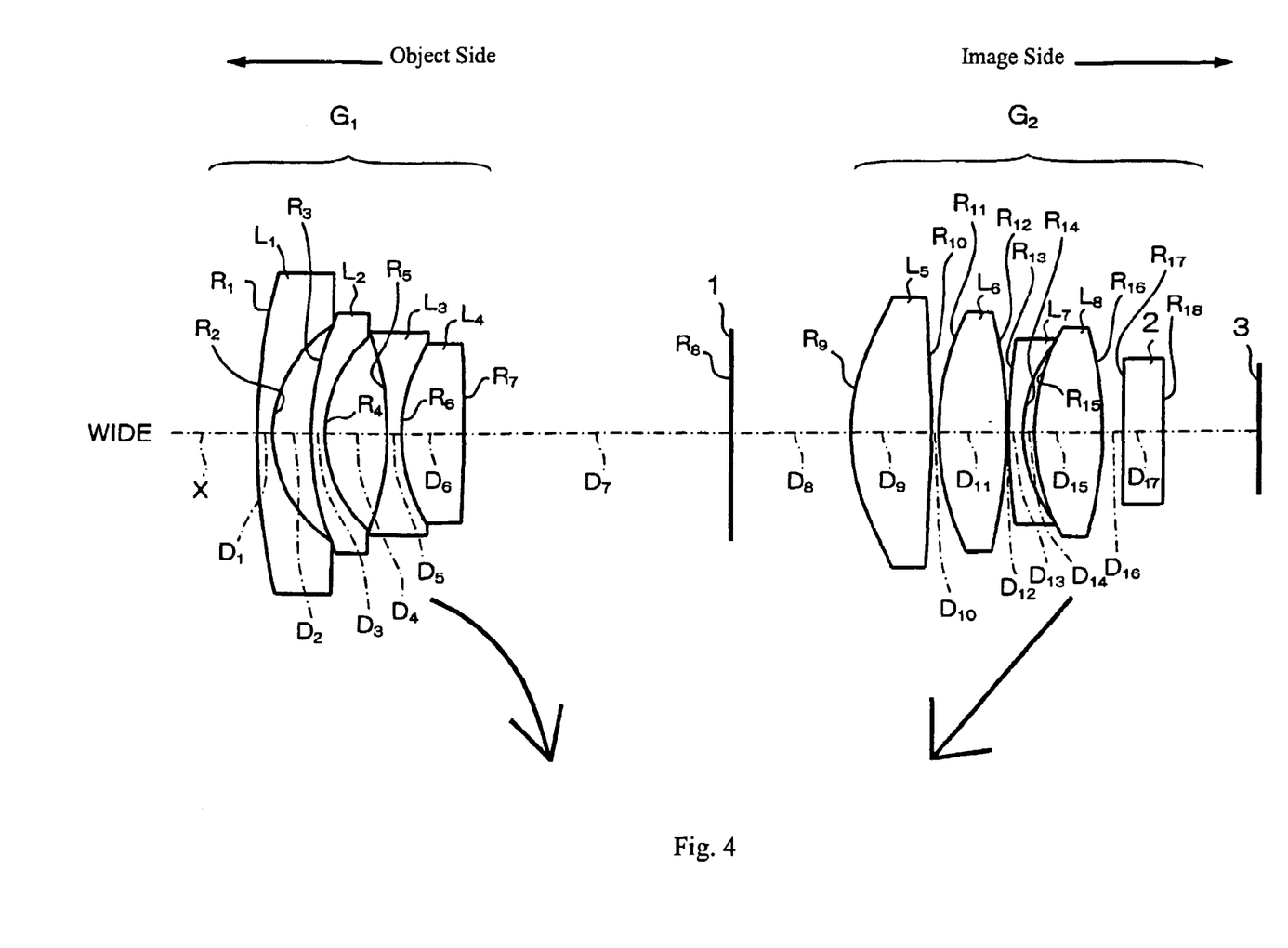
FIG. 4 shows a cross-sectional view of Embodiment 2 of the zoom optical system of the present invention at the wide-angle end.

FIG. 4 shows a cross-sectional view of Embodiment 2 of the zoom optical system of the present invention at the wide-angle end.

Table 5 below lists the surface number #, in order from the object side, the radius of curvature R (in mm) of each surface on the optical axis, the on-axis surface spacing D (in mm), as well as the refractive index $N_d$ and the Abbe number $\nu_d$ at the d-line (587.6 nm) of each optical element for Embodiment 2. Note that although R is the on-axis radius of curvature, for convenience of illustration, in FIG. 4 the lead lines from the R reference symbols extend to the surfaces being referenced but do not extend to the on-axis positions.

TABLE 5

| # | R | D | $N_d$ | $\nu_d$ |
|---|---|---|---|---|
| 1 | 33.5125 | 0.78 | 1.83400 | 37.2 |
| 2 | 6.3919 | 1.91 | | |
| 3 | 14.5281 | 0.70 | 1.51633 | 64.1 |
| 4 | 6.4383 | 3.10 | | |
| 5 | −14.6156 | 0.70 | 1.67270 | 32.1 |
| 6 | 8.6615 | 3.05 | 1.92286 | 18.9 |
| 7 | −109.7845 | D7 (variable) | | |
| 8 | ∞ (stop) | D8 (variable) | | |
| 9* | 10.2228 | 4.00 | 1.58913 | 61.2 |
| 10* | −33.9755 | 0.34 | | |
| 11 | 13.6815 | 3.38 | 1.49700 | 81.6 |
| 12 | −25.0959 | 0.12 | | |
| 13 | 30.7871 | 0.70 | 1.92286 | 18.9 |
| 14 | 7.1704 | 0.59 | | |
| 15 | 10.6662 | 3.39 | 1.72916 | 54.7 |
| 16 | −18.4172 | D16 (variable) | | |
| 17 | ∞ | 2.00 | 1.51633 | 64.1 |
| 18 | ∞ | | | |

The surfaces with a * to the right of the surface number in Table 5 are aspheric lens surfaces, and the aspheric surface shapes are expressed by Equation (A) above. As indicated in Table 5, both surfaces of the lens element $L_5$ of the second lens group $G_2$ are aspheric.

Table 6 below lists the values of the constant K and the aspherical coefficients $A_3$–$A_{10}$ used in Equation (A) above for each of the aspheric lens surfaces of Table 5. Aspheric coefficients that are not present in Table 6 are zero. An "E" in the data indicates that the number following the "E" is the exponent to the base 10. For example, "1.0E-2" represents the number $1.0 \times 10^{-2}$.

TABLE 6

| # | K | $A_3$ | $A_4$ | $A_5$ | $A_6$ |
|---|---|---|---|---|---|
| 9 | −0.1159056 | 1.42E−4 | 1.76E−4 | −8.11E−5 | 1.16E−5 |
| 10 | −44.7790884 | 1.27E−4 | 3.73E−4 | −1.10E−4 | 1.97E−5 |

| # | $A_7$ | $A_8$ | $A_9$ | $A_{10}$ |
|---|---|---|---|---|
| 9 | 9.63E−7 | −5.53E−7 | 5.46E−8 | −1.78E−9 |
| 10 | 7.31E−7 | −6.96E−7 | 6.28E−8 | −1.25E−9 |

In the zoom optical system of Embodiment 2, both the first lens group $G_1$ and the second lens group $G_2$ move during zooming. Therefore, the on-axis spacings D7, D8, and D16 change with zooming. With zooming, the focal length f, the f-number $F_{NO}$, and the field angle, that is, the angle of view, 2ω, of the zoom optical system also change. Table 7 below lists the values of the focal length f (in mm), the f-number $F_{NO}$, the field angle 2 ω (in degrees), and the variables D7, D8, and D16 (in mm) at the wide-angle end (f=2.05 mm) and at the telephoto end (f=5.34 mm) when the zoom optical system is focused at infinity.

TABLE 7

| f | $F_{NO}$ | 2ω | D7 | D8 | D16 |
|---|---|---|---|---|---|
| 2.05 | 0.99 | 137 | 13.12 | 6.04 | 1.00 |
| 5.34 | 1.55 | 49 | 1.89 | 0.99 | 6.06 |

The zoom optical system of Embodiment 2 of the present invention satisfies Conditions (1)–(6) above as set forth in Table 8 below.

TABLE 8

| Condition No. | Condition | Value |
|---|---|---|
| (1) | $N_{d21} > 1.55$ | 1.58913 |
| (2) | $v_{d22} > 68$ | 81.6 |
| (3) | $1.0 < |f2/f1| < 1.8$ | 1.54 |
| (4) | $v_{d14} < 25$ | 18.9 |
| (5) | $v_{d23} < 25$ | 18.9 |
| (6) | $|Rf_{22}/Rb_{22}| < 1.0$ | 0.545 |

Figure 5A:
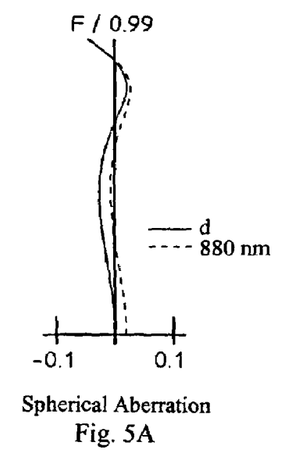
FIGS. 5A–5C show aberrations of Embodiment 2 of the zoom optical system of the present invention at the wide-angle end.
Figure 5B:
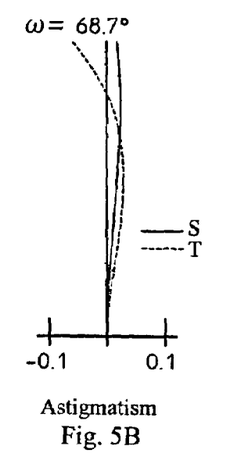
Figure 5C:
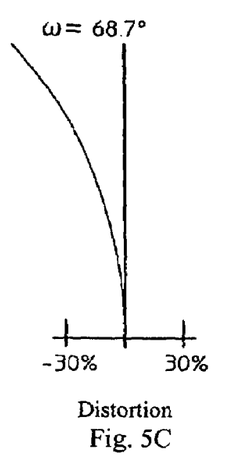
Figure 6A:
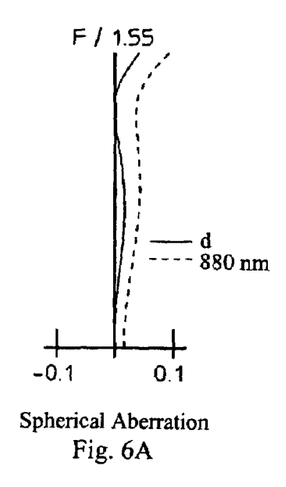
FIGS. 6A–6C show aberrations of Embodiment 2 of the zoom optical system of the present invention at the telephoto end.
Figure 6B:
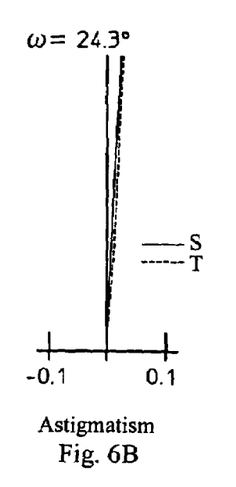
Figure 6C:
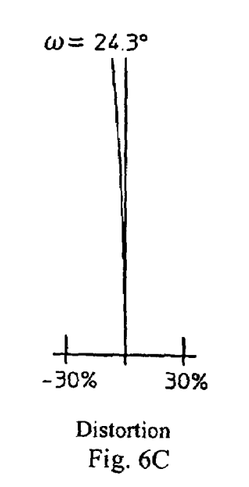

FIGS. 5A–5C show the spherical aberration, astigmatism, and distortion, respectively, of the zoom optical system of Embodiment 2 at the wide-angle end. FIGS. 6A–6C show the spherical aberration, astigmatism, and distortion, respectively, of the zoom optical system of Embodiment 2 at the telephoto end. In FIGS. 5A and 6A, the spherical aberration (in mm) is shown for the wavelengths 587.6 nm (the d-line) and 880 nm and the f-number is shown. In FIGS. 5B, 5C, 6B, and 6C, ω is the half-field angle. In FIGS. 5B and 6B, the astigmatism (in mm) is shown for the sagittal image surface S and the tangential image surface T. In FIGS. 5C and 6C, distortion (in percent) is measured at 587.6 nm (the d-line).

As shown by the above tables and the referenced figures, the zoom optical system of Embodiment 2 has a compact construction of eight lens elements, provides good correction of aberrations in both the visible light region and the near-infrared region, provides a bright image with an f-number in the range of 0.99 to 1.55, and provides a wide field angle, that is, a wide angle of view, 2 ω from about forty-nine degrees to about one hundred thirty-seven degrees.

The present invention is not limited to the aforementioned embodiments, as it will be obvious that various alternative implementations are possible. For instance, values such as the radius of curvature R of each of the lens components, the surface spacings D, the refractive index N, as well as the Abbe number v, are not limited to the examples indicated in each of the aforementioned embodiments, as other values can be adopted. Also, the number of lens elements in the first and second lens groups can be varied, and, in particular, the number of lens elements on the image side of the biconvex lens element L2-2 (lens element $L_6$ in FIG. 1) may be varied. Also, additional lens surfaces may be aspheric as, for example, one or more of the lens surfaces of the biconvex lens element L2-2 (lens element $L_6$ in FIG. 1). Additionally, although glass is used as the lens material of the lens elements in the examples above, plastic may also be used, especially for lens elements that include aspheric surfaces in order to reduce manufacturing costs associated with obtaining aspheric surfaces. Such variations are not to be regarded as a departure from the spirit and scope of the present invention. Rather, the scope of the present invention shall be defined as set forth in the following claims and their legal equivalents. All such modifications as would be obvious to one skilled in the art are intended to be included within the scope of the following claims.

What is claimed is:

1. A zoom optical system comprising, arranged along an optical axis in order from the object side as follows:

a first lens group having negative refractive power;

a stop; and a second lens group having positive refractive power;

wherein during zooming from the wide-angle end to the telephoto end, the first lens group moves along the optical axis toward the image side and the second lens group moves along the optical axis toward the object side;

said second lens group includes, in order from the object side, an object-side lens element that has positive refractive power and at least one aspheric surface, and a biconvex lens element;

wherein:

the zoom optical system zooms from the wide-angle end to the telephoto end by moving said second lens group toward the object side along the optical axis in order to increase the focal length of the zoom optical system and compensates for movement of the image plane caused by this movement of said second lens group by moving said first lens group toward the image side as the zoom optical system zooms from the wide-angle end to the telephoto end of the zoom range; and the following conditions are satisfied:

$N_{d21} > 1.55$ $v_{d22} > 68$ $1.0 < |f2/f1| < 1.8$ where
- $N_{d21}$ is the index of refraction at the d-line of said object-side lens element,
- $v_{d22}$ is the Abbe number at the d-line of said biconvex lens element,
- f2 is the focal length of said second lens group, and
- f1 is the focal length of said first lens group.

2. The zoom optical system of claim 1, wherein the zoom optical system includes only two lens groups.

3. The zoom optical system of claim 1, wherein
said first lens group includes, in order from the object side, a first lens element having negative refractive power and a meniscus shape, a second lens element having negative refractive power and a meniscus shape, a biconcave third lens element, and a fourth lens element having positive refractive power; and
said second lens group further includes, in order from the image side of said biconvex lens element of said second lens group, a lens element having negative refractive power and a meniscus shape, and another biconvex lens element;
wherein
the following conditions are satisfied:

$$v_{d14}<25$$

$$v_{d23}<25$$

where
- $v_{d14}$ is the Abbe number at the d-line of said fourth lens element, and
- $v_{d23}$ is the Abbe number at the d-line of said lens element of said second lens group having negative refractive power and a meniscus shape.

4. The zoom optical system of claim 3, wherein the zoom optical system includes only two lens groups.

5. The zoom optical system of claim 3, wherein said first lens group consists of four lens elements and said second lens group consists of four lens elements.

6. The zoom optical system of claim 5, wherein said first lens group consists of three lens components and said second lens group consists of four lens components.

7. The zoom optical system of claim 2, wherein said first lens group consists of four lens elements and said second lens group consists of four lens elements.

8. The zoom optical system of claim 7, wherein said first lens group consists of three lens components and said second lens group consists of four lens components.

9. The zoom optical system of claim 1, wherein the following condition is satisfied:

$$|Rf_{22}/Rb_{22}|<1.0$$

where
- $Rf_{22}$ is the radius of curvature of the object-side surface of said biconvex lens element of said second lens group, and
- $Rb_{22}$ is the radius of curvature of the image-side surface of said biconvex lens element of said second lens group.

10. The zoom optical system of claim 9, wherein the zoom optical system includes only two lens groups.

11. The zoom optical system of claim 3, wherein the following condition is satisfied:

$$|Rf_{22}/Rb_{22}|<1.0$$

where
- $Rf_{22}$ is the radius of curvature of the object-side surface of said biconvex lens element of said second lens group, and
- $Rb_{22}$ is the radius of curvature of the image-side surface of said biconvex lens element of said second lens group.

12. The zoom optical system of claim 11, wherein the zoom optical system includes only two lens groups.

13. The zoom optical system of claim 12, wherein said first lens group consists of four lens elements and said second lens group consists of four lens elements.

14. The zoom optical system of claim 13, wherein said first lens group consists of three lens components and said second lens group consists of four lens components.

15. The zoom optical system of claim 10, wherein said first lens group consists of four lens elements and said second lens group consists of four lens elements.

16. The zoom optical system of claim 15, wherein said first lens group consists of three lens components and said second lens group consists of four lens components.

17. The zoom optical system of claim 1, wherein said object-side lens element of said second lens group is a biconvex lens element that includes two aspheric surfaces.

18. The zoom optical system of claim 2, wherein said object-side lens element of said second lens group is a biconvex lens element that includes two aspheric surfaces.

19. The zoom optical system of claim 3, wherein said object-side lens element of said second lens group is a biconvex lens element that includes two aspheric surfaces.

20. The zoom optical system of claim 9, wherein said object-side lens element of said second lens group is a biconvex lens element that includes two aspheric surfaces.

* * * * *